United States Patent
Okada (10) Patent No.: US 8,414,205 B2
(45) Date of Patent: Apr. 9, 2013

(54) INTERMEDIATE ACCESSORY FOR CAMERA SYSTEM, AND CAMERA SYSTEM USING THE SAME

(75) Inventor: Koji Okada, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 71 days.

(21) Appl. No.: 13/197,357

(22) Filed: Aug. 3, 2011

(65) Prior Publication Data

US 2012/0033955 A1     Feb. 9, 2012

(30) Foreign Application Priority Data

Aug. 6, 2010   (JP) .................................. 2010-177019

(51) Int. Cl.
*G03B 17/12*   (2006.01)
*G03B 17/56*   (2006.01)

(52) U.S. Cl.
USPC ........................................... 396/530; 396/71

(58) Field of Classification Search .................... 396/71, 396/530

See application file for complete search history.

(56) References Cited

U.S. PATENT DOCUMENTS

| | | | | |
|---|---|---|---|---|
| 4,572,638 A * | 2/1986 | Nakai et al. | ..................... | 396/71 |
| 5,257,058 A * | 10/1993 | Mabuchi | ....................... | 396/71 |
| 5,548,369 A * | 8/1996 | Iijima | ............................. | 396/71 |
| 6,407,774 B1 * | 6/2002 | Mabuchi et al. | ............. | 348/335 |
| 6,707,992 B2 * | 3/2004 | Uenaka et al. | .................. | 396/71 |
| 6,717,618 B1 * | 4/2004 | Yoshikawa | .................... | 348/360 |
| 7,522,828 B2 * | 4/2009 | Doi et al. | ....................... | 396/71 |
| 2006/0098114 A1 * | 5/2006 | Horii | ............................ | 348/360 |
| 2011/0229114 A1 * | 9/2011 | Okada | ............................ | 396/71 |
| 2011/0229115 A1 * | 9/2011 | Okada | ............................ | 396/71 |

FOREIGN PATENT DOCUMENTS

| | | |
|---|---|---|
| JP | 63-199335 A | 8/1988 |
| JP | 2002-341424 A | 11/2002 |

* cited by examiner

*Primary Examiner* — Clayton E Laballe
*Assistant Examiner* — Leon W Rhodes, Jr.
(74) *Attorney, Agent, or Firm* — Rossi, Kimms & McDowell LLP (57) ABSTRACT

An intermediate accessory enables a camera and an exchange lens to communicate with each other through an information processor configured to provide predetermined processing for information received from one of the camera and the exchange lens, and to transmit information that has undergone the predetermined processing, to the other of the camera and the exchange lens, while the camera and the exchange lens are being attached. The intermediate accessory obtains lens identification information from the exchange lens, which is used to identify the exchange lens. The intermediate accessory enables a camera and an exchange lens to communicate with each other without intervening the information processor and transfers to an operation restricting mode used to restrict at least part of an operation the intermediate accessory, when the lens identification information indicates a specific exchange lens that does not require the predetermined processing.

13 Claims, 7 Drawing Sheets

INTERMEDIATE ACCESSORY FOR CAMERA SYSTEM, AND CAMERA SYSTEM USING THE SAME

BACKGROUND OF THE INVENTION

1. Field of the Invention

The present invention relates to a camera system that attaches an intermediate accessory between a camera and an exchange lens.

2. Description of the Related Art

In the camera system including a camera and an exchange lens, optical information peculiar to an exchange lens, such as information of a focal length, a stop, focus sensitivity, and a focus correcting amount) is communicated to the camera. When possessing the optical information peculiar to the exchange lens, the camera can provide appropriate autofocus ("AF") and auto-exposure ("AE") in combination with that exchange lens.

One of such camera systems may enable an intermediate accessory, such as an extender, to be attached between the camera and the exchange lens. When the intermediate accessory is attached, the optical information peculiar to the intermediate accessory as well as the optical information of the exchange lens needs to be considered in order to provide proper AF, AE, etc., in the camera. Thus, when an intermediate accessory is attached, the camera or exchange lens detects the intermediate accessory and the optical information of the exchange lens needs to be corrected based on optical information of the intermediate accessory.

However, when a new intermediate accessory with a new design is combined with an old camera and an old exchange lens each of which has an old design or function, the old camera and the old exchange lens have no optical information of the new intermediate accessory and thus cannot provide the above correction processing of the optical information.

As one solution for this problem, an intermediate accessory disclosed in Japanese Patent Laid-Open No. ("JP") 63-199335 includes an internal CPU and the accessory CPU converts or writes down optical information transmitted from the exchange lens to the camera, into data that reflects influence of optical information of the intermediate accessory. In addition, the intermediate accessory disclosed in JP 2002-341424 corrects optical information of an exchange lens and transmits it to the camera when the combined camera and exchange lens are old types.

When a new camera and a new exchange lens are combined with each other and the combination can provide correction processing to the optical information of the exchange lens based on the optical information of the intermediate accessory, it is unnecessary for the intermediate accessory to perform the correction processing of the optical information by itself. Therefore, the intermediate accessory if attached to the new camera and the new exchange lens may transfer to an operational state that prohibits the correction processing in order to save the (useless) power consumption for the correction processing.

At that time, if the power supply to the intermediate accessory is interrupted to stop its operation, the intermediate accessory does not respond to a new camera's request for information necessary for the operation of the camera, such as identification information of the intermediate accessory.

In addition, if a new camera communicates with a new exchange lens with a protocol which the intermediate accessory cannot normally recognize before the intermediate accessory detects the new camera and the new lens, the intermediate accessory may work improperly and consequently the entire camera system is likely to malfunction.

SUMMARY OF THE INVENTION

The present invention provides an intermediate accessory and a camera system using the same, which can reduce useless power consumption while avoiding malfunctions of the intermediate accessory and camera system.

An intermediate accessory according to one aspect of the present invention is attachable between a camera and an exchange lens which are configured to communicate with each other. The intermediate accessory includes an information processor configured to provide predetermined processing for information received from one of the camera and the exchange lens, and to transmit information that has undergone the predetermined processing, to the other of the camera and the exchange lens, a first communication channel configured to enable the camera and the exchange lens to communicate with each other without intervening the information processor, a second communication channel configured to enable the camera and the exchange lens to communicate with each other through the information processor, and a switch configured to switch between a first connection state and a second connection state, the first connection state connecting the first communication channel and disconnecting the second communication channel, and the second connection state disconnecting the first communication channel and connecting the second communication channel. The intermediate accessory sets the second connection state using the switch while the camera and the exchange lens are being attached. The intermediate accessory obtains lens identification information from the exchange lens, which is used to identify the exchange lens. The intermediate accessory sets the first connection state using the switch and transfers to an operation restricting mode used to restrict at least part of an operation the intermediate accessory, when the lens identification information indicates a specific exchange lens that does not require the predetermined processing.

Alternatively, the intermediate accessory sets the second connection state using the switch, while the camera and the exchange lens are attached. The intermediate accessory obtains lens identification information used to identify the exchange lens, and camera identification information used to identify the camera, which are communicated between the camera and the exchange lens through the first communication channel. The intermediate accessory transfers to an operation restricting mode used to restrict at least part of an operation of the intermediate accessory when the lens identification information indicates a specific exchange lens that does not require the predetermined processing, and the camera identification information indicates a specific camera that does not require the predetermined processing.

A camera system that includes a camera and an exchange lens which are configured to communicate with each other, and the above intermediate accessory attached between the camera and the exchange lens, also constitutes another aspect of the present invention.

Further features of the present invention will become apparent from the following description of exemplary embodiments with reference to the attached drawings.

DESCRIPTION OF THE EMBODIMENTS

Referring now to the accompanying drawings, a description will be given of embodiments of the present invention.

In the following embodiments, assume there are a camera and an exchange lens which were designed (developed) before the predetermined time, and an intermediate accessory that was developed later than the predetermined time. The former will be referred to as an old camera and an old exchange lens, and the latter will be referred to as a new intermediate accessory. Since the development time is different, the old camera and old exchange lens cannot store the optical information peculiar to the new intermediate accessory in the internal memory. In addition, the camera and the exchange lens that were designed after the intermediate accessory will be referred to as a new camera (specific camera) and a new exchange lens (specific lens).

First Embodiment

Figure 1:
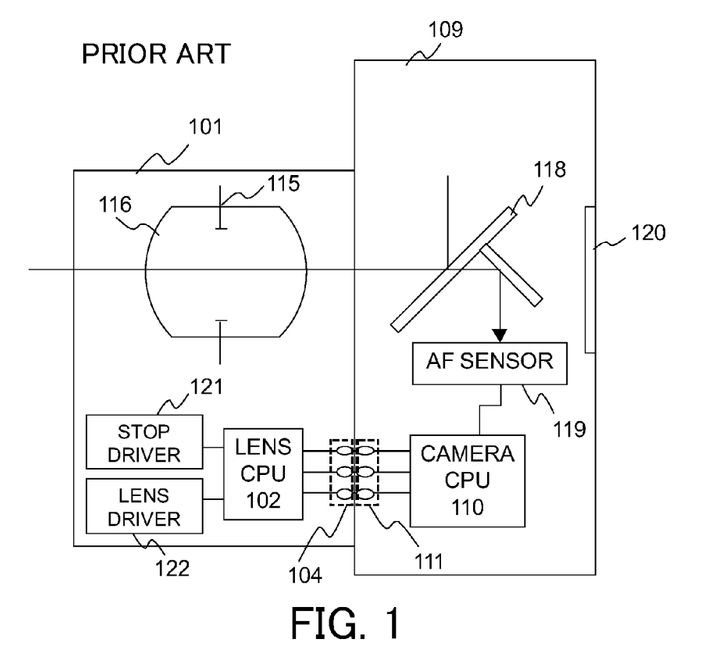
FIG. 1 is a block diagram illustrating a structure of a camera system that has no intermediate accessory according to a first embodiment of the present invention.

FIG. 1 illustrates a camera system according to a first embodiment of the present invention, which includes a single-lens reflex camera (referred to as a "camera" hereinafter), an exchange lens exchangeably attached to the camera, and no intermediate accessory.

In the camera system in FIG. 1, a camera 109 and an exchange lens 101 are connected via communication terminals 111, 104 so that they can communicate information with each other.

A lens CPU 102 as a lens controller provided in the exchange lens 101 stores optical information peculiar to the exchange lens 101 (referred to as "lens optical information"), in an internal memory (not illustrated). The lens CPU 102 transmits the lens optical information to a camera CPU 110 as a camera controller provided in the camera 109 via the communication terminals 104, 111. The lens optical information contains information of a focal length of an image pickup optical system 116, information relating to a stop 115, information of focus sensitivity representing a relationship between a moving amount of a focus lens and a displacement amount of a focus position, and information of a focus correcting amount depending upon an image pickup condition, such as the temperature and a light source configured to illuminate an object.

The exchange lens 101 and the camera 109 are configured to communicate information of their operational states, their setting states, request instructions (transmission instruction) of a variety of information, and a driving instruction via communication terminals 111, 104.

The image pickup optical system 116 that includes a magnification variable lens, a focus lens, and a stop 115 is provided in the exchange lens 101. A light flux from the object passes the image pickup optical system 116, and is split into a light flux that is led to a finder optical system (not illustrated) by a main mirror 118 provided in the camera 109, and a light flux led to an AF sensor 119. The camera CPU 110 processes an output of the AF sensor 119, detects a focus state of the image pickup optical system 116, and calculates a driving amount of the focus lens to obtain the in-focus state of the image pickup optical system 116 on the object based on the detection result and the above lens optical information.

The camera CPU 110 transmits the calculated focus-lens driving amount to the lens CPU 102 via the communication terminals 111, 104. The lens CPU 102 controls the lens driver 122 in accordance with the received focus-lens driving amount, and moves the focus lens to the in-focus position.

In addition, the camera CPU 110 calculates a driving amount of the stop 115 corresponding to the stop value set by a user or a photometry result by a photometric detector (not illustrated) when a release switch (not illustrated) provided in the camera 109 is half-pressed. The camera CPU 110 transmits the stop driving amount via the communication terminals 111, 104. The lens CPU 102 controls a stop driver 121 in accordance with the received stop driving amount, and drives the stop 115. Moreover, the camera CPU 110 drives a shutter (not illustrated) installed in front of the main mirror 118 and the image pickup element 120 when the release switch is fully pressed, thereby introducing the light flux from the image pickup optical system 116 to the image pickup element 120, and taking an image. The image pickup element 120 is a photoelectric conversion element, such as a CCD sensor and a CMOS sensor. The camera CPU 110 generates image data based on an output of the image pickup element 120, and records it in a recording medium.

Figure 2:
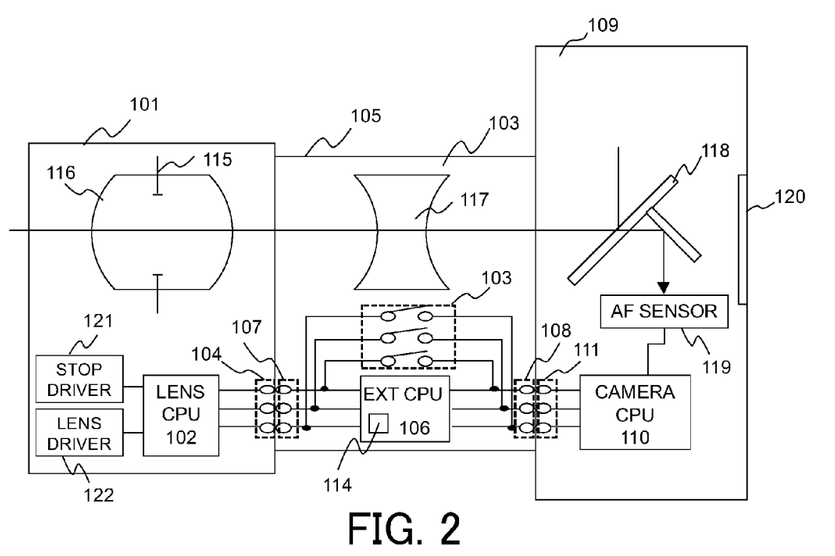
FIG. 2 is a block diagram illustrating a structure of a camera system that has an intermediate accessory according to the first embodiment of the present invention.

FIG. 2 illustrates a camera system that attaches an intermediate accessory 105 between the exchange lens 101 and the camera 109 illustrated in FIG. 1. The intermediate accessory 105 of this embodiment is an extender having an extender lens 117. However, the intermediate accessory may use a member other than the extender, such as a macro converter, and a tilt/shift adapter.

The extender 105 is connected to the communication terminal 104 of the exchange lens 101 via a communication terminal 107, and the communication terminal 111 of the camera 109 via a communication terminal 108. Thereby, the exchange lens 101, the camera 109, and the extender 105 are connected so that they can communicate information with one another.

An accessory CPU (referred to as an "EXT CPU" hereinafter) 106 as an accessory controller is provided in the extender 105, and serves as an (information) processor configured to process the information and signals input into the extender 105. The EXT CPU 106 includes a communication monitor (not illustrated), and is configured to observe (monitor or detect) communication contents or communicated information between the camera 109 and the exchange lens 101 (referred to as a "camera-lens communication" hereinafter).

A communication disconnecting switch 103 is provided on a first communication channel that enables a direct communication between the camera 109 and the exchange lens 101 without intervening the EXT CPU 106. When the communication disconnecting switch 103 is set to a connection state, the camera-lens communication is provided through the first communication channel. At this time, a second communication channel configured to enable the camera 109 and the exchange lens 101 to be connected via the EXT CPU 106 is set to a disconnection state. This state corresponds to the first connection state. On the other hand, when the first communication channel is set to the disconnection state by the communication disconnection switch 103, the camera-lens communication is performed through the second communication channel. This state corresponds to the second connection state. Thus, by switching the communication disconnecting switch 103, one of the first and second communication channels can be set to the connection state and the other of the first and second communication channels can be set to the disconnection state.

A memory 114 in the EXT CPU 106 stores information for correction processing (or predetermined processing) of lens optical information received from the exchange lens 101 based on the optical information peculiar to the extender 105 (extender lens 117). The optical information peculiar to the extender 105 (extender lens 117) will also be referred to as extender optical information (accessory optical information) hereinafter. The extender optical information contains information, such as a focus correcting amount of the extender lens 117.

When the designs of the exchange lens 101 and the camera 109 are older than the design of the extender 105, neither the exchange lens 101 nor the camera 109 possesses the extender optical information. Hence, in order to reflect the extender optical information and obtain the lens optical information corrected based on the extender optical information, the extender 105 (EXT CPU 106) which stores the extender optical information provides the correction processing of the lens optical information.

The memory 114 also stores other information, such as a computer program, such as a firmware, for an operation of the EXT CPU 106.

It is unnecessary to provide the memory 114 into the EXT CPU 106 as long as the EXT CPU 106 can draw information from the memory 114.

Figure 3:
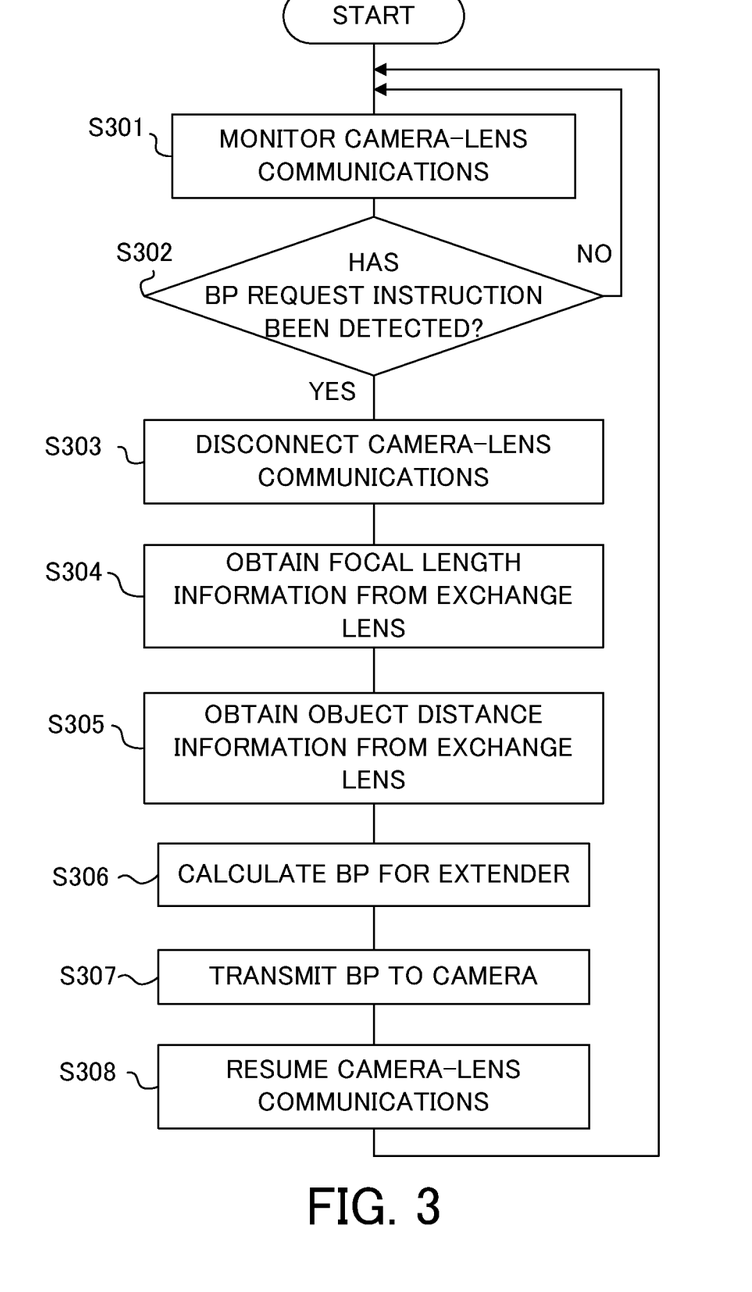
FIG. 3 is a flowchart illustrating an operation of the intermediate accessory according to the first embodiment.

Referring now to FIG. 3, a description will be given of the correction processing of the lens optical information when the extender 105 is combined with the old exchange lens and the old camera which are older than the extender 105 and require the lens optical information to be corrected or exchanged based on the extender optical information by the extender 105. A flowchart in FIG. 3 illustrates a procedure of correction processing of information relating to the focus correcting amount (referred to as "BP" hereinafter) among the lens optical information. This processing and following other processing will be performed in accordance with the computer program.

In step S301, the EXT CPU 106 monitors the contents of the camera-lens communication via the communication terminals 107, 108 while the extender 105 is being attached to the camera 109 and the exchange lens 101. In step S302, when the EXT CPU 106 detects that the camera CPU 110 sends a BP request instruction to the lens CPU 102 during monitoring, the flow moves to step S303. In the step S303, the EXT CPU 106 sets the communication disconnecting switch 103 to the disconnection state so that the camera-lens communication can be performed via the second communication channel.

Thereafter, in step S304, the EXT CPU 106 sends a request instruction of focal length information to the lens CPU 102, and obtains focal distance information of the image pickup optical system 116 as one piece of information necessary to correct (or exchange) the BP. In step S305, the EXT CPU 106 sends a request instruction of object distance information to the lens CPU 102, and obtains object distance information as one piece of information necessary to correct the BP. In step S306, the EXT CPU 106 calculates new BP corresponding to the extender lens 117 (referred to as corrected BP or information that has undergone the predetermined processing) using the extender optical information and the focal length information and the object distance information obtained in the steps S304 and S305.

The EXT CPU 106 calculates the corrected BP using the focal length information and the object distance information in this embodiment, but may select BP corresponding to the focal length information and the object distance information from the previously prepared table.

In addition, according to this embodiment, in calculating the corrected BP, the EXT CPU 106 transmits the request instructions of information of the focal length and the object distance to the lens CPU 102, and CPU 102 that receives these request instructions return that information to the EXT CPU 106. However, the lens CPU 102 may automatically send information of the focal distance and object distance to the EXT CPU 106 even when the EXT CPU 106 does not send the above request instructions.

Moreover, according to this embodiment, the camera CPU 110 transmits the BP request instruction to the lens CPU 102, and the lens CPU 102 that has received the request instruction sends the BP. However, the lens CPU 102 may automatically sends the BP even when the camera CPU 110 does not send the request instruction.

Next, in step S307, the EXT CPU 106 sends the calculated or corrected BP to the camera PCU 110. After the transmission ends, the EXT CPU 106 switches the communication disconnecting switch 103 to the connection state so that the camera-lens communication can be enabled through the first communication channel in step S308.

Thereafter, the EXT CPU 106 returns to the step S301, and continues to monitor the camera-lens communication until the camera resends the BP request instruction.

It is necessary for the above correction processing to determine whether the correction processing of the lens optical information by the EXT CPU 106 is necessary for the camera 109 and the exchange lens 101 to which the extender 105 is attached. According to this embodiment, in order to determine whether the correction processing of the lens optical information by the EXT CPU 106 is necessary, the (product) types of the camera 109 and the exchange lens 101 are determined. When the correction processing is determined unnecessary, the EXT CPU 106 transfers to the power-saving mode. A description will now be given of this operation with reference to FIGS. 4 and 5.

Figure 4:
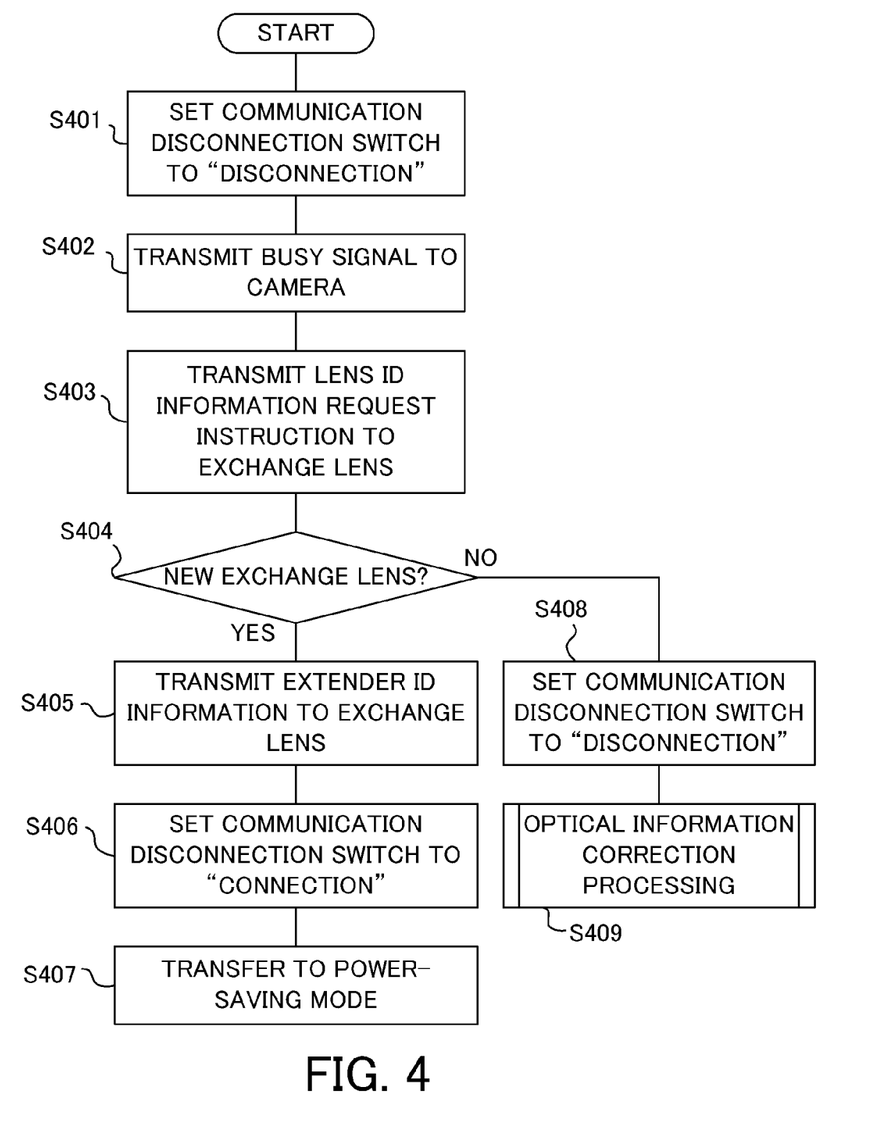
FIG. 4 is a flowchart illustrating an operation of the intermediate accessory according to the first embodiment.

The flowchart of FIG. 4 illustrates an operation of the EXT CPU 106 while the extender 105 is being attached to the camera 109 and the exchange lens 101. This operation is performed as an initialization when the extender 105 is attached to the camera 109 and the exchange lens 101, the camera 109 is powered on, and the power supply from the camera 109 to the extender 105 and the exchange lens 101 is started. However, this processing is not necessarily performed as the initialization, and may be performed as soon as the power supply is started.

When the power is supplied to the EXT CPU 106, the EXT CPU 106 sets the communication disconnecting switch 103 to the disconnection state in step S401 so that the camera-lens communication can be performed through the second communication channel. Although the communication disconnecting switch 103 is set to the disconnection state by the operation of the EXT CPU 106 in this embodiment, another hardware configuration may be used to automatically set the switch to the disconnection state in response to the attachment.

The second communication channel is set to the connection state in order to avoid systemization that suddenly starts a communication with a new communication protocol which the EXT CPU 106 cannot recognize, between the new camera and the new exchange lens to which the extender 105 is attached. The communication which the EXT CPU 106 cannot recognize, between the new camera and the new exchange lens causes malfunctions of the extender 105 (EXT CPU 106). Therefore, before the camera-lens communication starts, EXT CPU 106 needs to determine whether the camera 109 and the exchange lens 101 are new or old.

In step S402, the EXT CPU 106 sends a busy signal to the camera CPU 110 so as to inform the camera CPU 110 of a communication disable state and to prevent the camera CPU 110 from starting the communication after setting the communication disconnecting switch 103 to the disconnection state. In step S403, the EXT CPU 106 transmits a lens identification information request instruction to the lens CPU 102, and obtains the lens identification information from the lens CPU 102. The lens identification information contains information, such as a product type number used to identify a (product) type of the exchange lens 101, but may contain information, such as information on a function of the exchange lens 101, and a product (serial) number that identifies an individual product among the same types of products.

The EXT CPU 106 that has obtained the lens identification information determines the product type of the exchange lens 101 based on the lens identification information in step S404. When the lens identification information indicates that the product type of an exchange lens does not need the correction processing of the lens optical information, or the exchange lens 101 is a "new exchange lens" that is newer in design than the extender 105, the flow proceeds to step S405.

In the step S405, the EXT CPU 106 transmits extender identification information (intermediate accessory identification information) to the lens CPU 102. The extender identification information, as used herein, contains information used to identify a product type of the extender, but may contain information, such as information on a function of the extender and information of a product (serial) number that can identify an individual product among the same type of products.

Next, in step S406, the EXT CPU 106 sets the communication disconnecting switch 103 to the connection state so that the camera-lens communication can be performed through the first communication channel. Thereafter, in step S407, the EXT CPU 106 transfers to the power-saving mode.

The "power-saving mode" means a mode by which the power consumption in the extender 105 is reduced in comparison with the normal mode, for example, by limiting the power supply to the EXT CPU 106, by reducing the operational frequency of the EXT CPU 106, or by stopping the calculation processing to the EXT CPU 106. The "power-saving mode" is simply an illustration of the effective operation restricting mode used to restrain the power consumption in the EXT CPU 106 and to avoid the malfunctions of the EXT CPU 106 by restricting at least part of the operations of the EXT CPU 106. Therefore, the EXT CPU 106 may transfer to another operation restricting mode other than the "power-saving mode."

The lens CPU 102 of the new exchange lens that has received extender identification information from the EXT CPU 106 in the step S405 stores the extender identification information in the memory (not illustrated) in the lens CPU 102. Whether this memory is a non-volatile memory or a volatile memory is not a matter as long as it can store extender identification information while the extender 105 is set to the power-saving mode.

In step S404, when the lens identification information indicates that the product type of the exchange lens requires the correction processing of the lens optical information or when the exchange lens 101 is an old exchange lens that is older in design than the extender 105, then the flow proceeds to step S408.

In the step S408, the EXT CPU 106 sets the communication disconnecting switch 103 to the disconnection state so that the camera-lens communication can be performed through the second communication channel or through the EXT CPU 106. Thereafter, in step S409, the EXT CPU 106 proceeds with the correction processing of the lens optical information described with reference to the flowchart in FIG. 3.

The EXT CPU 106 does not send the extender identification information to the old exchange lens. This is because the old exchange lens is older in design than the extender 105, cannot recognize the extender identification information, and is likely to improperly operate by misunderstanding it as another communication command.

In the step S409, another operation may be performed in addition to the correction processing of the lens optical information described in the flowchart in FIG. 3.

Figure 5:
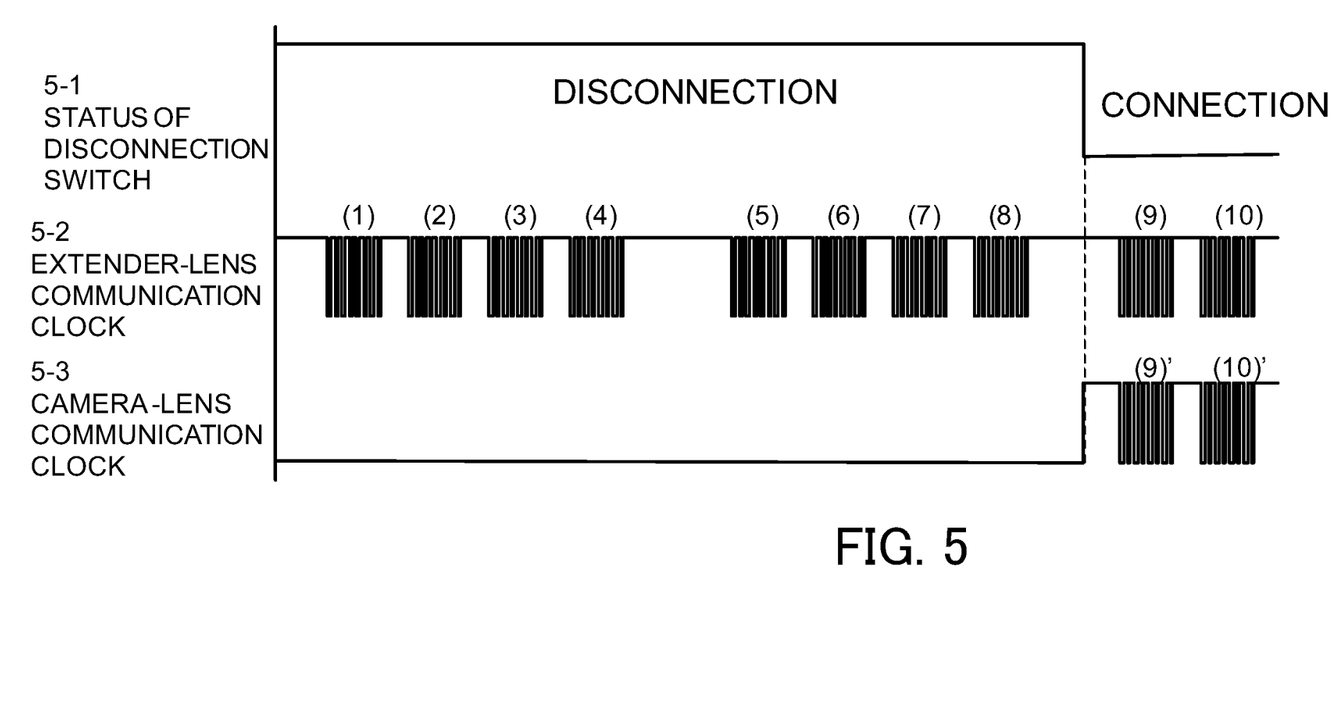
FIG. 5 is a timing chart illustrating operational timings of the intermediate accessory according to the first embodiment.

A timing chart in FIG. 5 illustrates a time sequence of an operation of the camera system in which the extender 105 is attached to the new exchange lens. Reference numeral 5-1 denotes a state of the communication disconnecting switch 103 (disconnection state or connection state). Reference numeral 5-2 denotes a communication clock between the extender 105 and the exchange lens 101. Reference numeral 5-3 denotes a communication clock between the camera 109 and the extender 105.

(1) to (4) in the extender-lens communication clock 5-2 illustrates transmission/reception timings of lens identification information request instruction transmitted from the extender 105 to the exchange lens 101 and responding lens identification information transmitted from the exchange lens 101 to the extender 105. (5) to (8) in the extender lens communication clock 5-2 illustrates transmission/reception timings of extender identification information request instruction transmitted from the extender 105 to the exchange lens 101. When the communication disconnecting switch 103 is set to the disconnection state, the extender 105 fixes the communication clock to the low state or outputs the busy signal, thereby refusing a communication from the camera 109.

As described above, after the extender 105 transmits the extender identification information to the exchange lens 101 in (8), the extender 105 (EXT CPU 106) switches the communication disconnecting switch 103 from the disconnection state to the connection state, and transfers to the power-saving mode.

After that, the first communication channel as a direct communication line between the camera 109 and the exchange lens 101 is set to the connection state, and thus the extender-lens communication clock 5-2 after (9) and the camera-lens communication clock 5-3 after (9)' employ the same communication clock. The extender 105 (EXT CPU 106) does not involve in the communication between the camera 109 and the exchange lens 101 after it is transferred to the power-saving mode. Therefore, the camera 109 and the exchange lens 101 can communicate with each other at a similar communication speed and with a similar consumption power to those with no extender 105 attached.

Since the exchange lens 101 has already recognized the product type of the attached extender 105, it converts the lens optical information into a value that reflects the optical information of the extender 105, and transmits the value to the camera 109. Thereby, an optical offset caused by the attachment of the extender 105 can be eliminated.

When the camera 109 (camera CPU 110) transmits the extender identification signal request instruction to the exchange lens 101, the exchange lens 101 (lens CPU 102) sends back the extender identification information stored in the internal memory to the camera 109. Thereby, even when the extender 105 (EXT CPU 106) little works in the power-saving mode, the camera 109 can obtain extender identification information (such as information of a product type and a product number). The camera 109 can further correct the lens optical information or processes generated image data. In addition, the extender identification information may be added to the image data when the image data is recorded.

The extender 105 (EXT CPU 106) does not release the power-saving mode (operation restricting mode) by the communication from the camera 109 and the exchange lens 101, but maintains the power-saving mode.

According to this embodiment, in a camera system in which the extender 105 does not require the correction of the lens optical information, the extender 105 enables the direct communication between the exchange lens 101 and the camera 109, and transfers to the power-saving mode (operation restricting mode). Thereby, this embodiment can realize a camera system that can reduce the power consumption, and avoid malfunctions of the extender 105, the camera 109, and the exchange lens 101.

Second Embodiment

A description will now be given of an extender as an intermediate accessory according to a second embodiment of the present invention and a camera system including the intermediate accessory. The basic structure of this embodiment is similar to that of the first embodiment, and those elements which are the same elements in the first embodiment will be designated by the same reference numerals. This embodiment addresses differences from the first embodiment.

Figure 6:
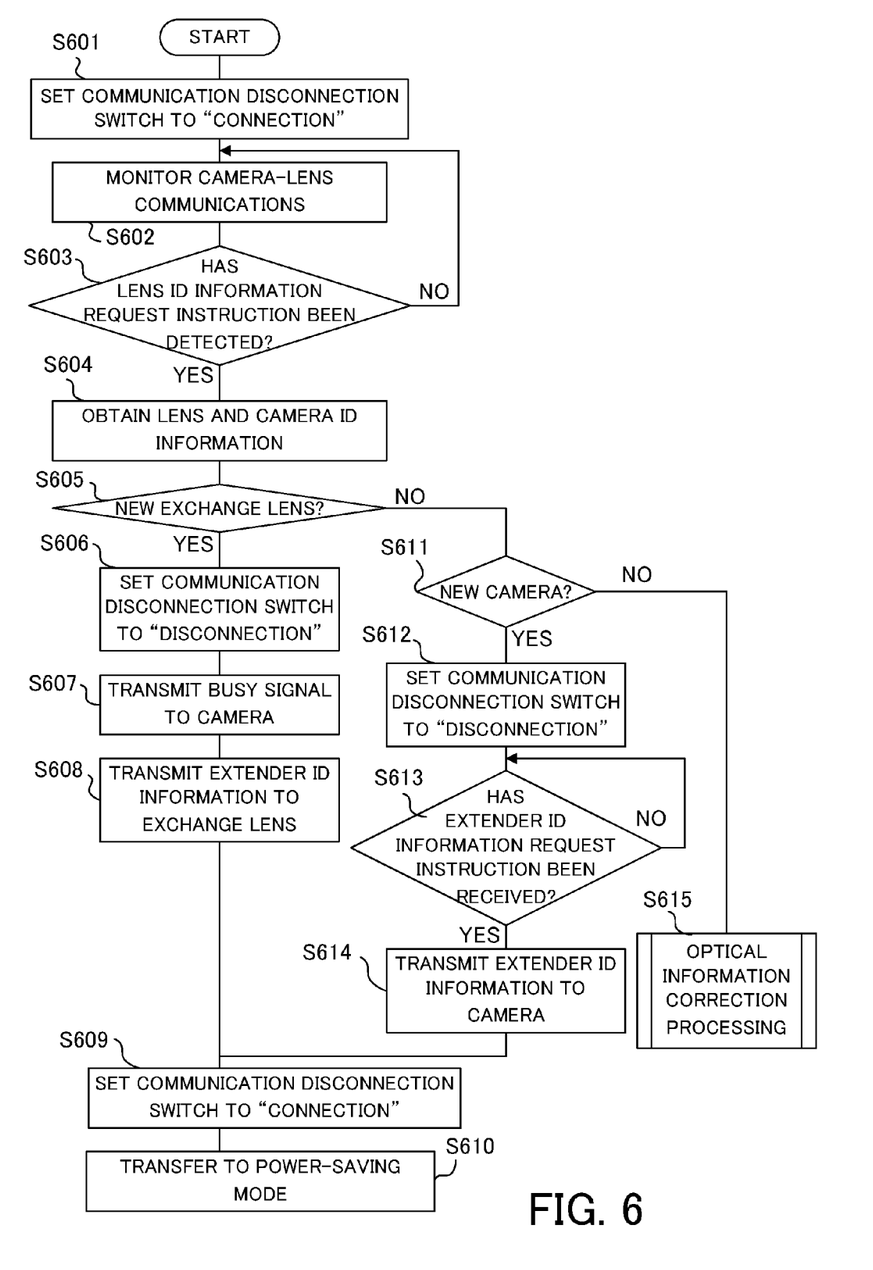
FIG. 6 is a flowchart illustrating an operation of an intermediate accessory according to a second embodiment of the present invention.

A flowchart illustrated in FIG. 6 illustrates an operation of the EXT CPU 106 which is performed when the extender 105 is attached to the camera 109 and the exchange lens 101. This operation is performed as an initialization when the extender 105 is attached to the camera 109 and the exchange lens 101, the camera 109 is powered on, and the power supply from the camera 109 to the extender 105 and the exchange lens 101 is started. However, this processing is not necessarily performed as the initialization, and may be performed as soon as the power supply is started.

When the power is supplied to the EXT CPU 106, the EXT CPU 106 sets the communication disconnecting switch 103 to the connection state in step S601 so that the camera-lens communication can be performed through the first communication channel. Although the communication disconnecting switch 103 is set to the connection state by the operation of the EXT CPU 106 in this embodiment, another hardware configuration may be used to automatically set the switch to the connection state in response to the attachment.

The first communication channel is set to the connection state in order to avoid systemization that suddenly starts a communication with a new communication protocol which the EXT CPU 106 cannot recognize, between the new camera and the new exchange lens to which the extender 105 is attached.

In step S602, the EXT CPU 106 monitors the contents of the camera-lens communication via the communication terminals 107, 108 while the extender 105 is being attached to the camera 109 and the exchange lens 101. In the step S603, when the camera CPU 110 detects that the camera CPU 110 sends a lens identification information request instruction to the lens CPU 102 during monitoring, the EXT CPU 106 moves to step S604. In the step S604, the EXT CPU 106 obtains camera identification information and the lens identification information which are communicated between the camera CPU 110 and the lens CPU 102. The lens identification information is the same as that described in the first embodiment. The camera identification information contains information, such as a product type number used to identify the product type of the camera 109, but may contain information of a function of the camera 109 or information of a product (serial) number that can identify an individual product in the same product type.

The EXT CPU 106 that has obtained the lens identification information determines a product type of the exchange lens 101 based on the lens identification information in step S605. When the lens identification information indicates that the exchange lens 101 is a new exchange lens that does not need the correction processing of the lens optical information, the EXT CPU 106 transmits extender identification information to the exchange lens 101. More specifically, the EXT CPU 106 switches the communication disconnecting switch 103 to the disconnection state in the step S606, and enables the camera-lens communication through the second communication channel. The EXT CPU 106 sends a busy signal (which is a signal indicative of communication disabled state) to the camera 109, thereby refusing a communication from the camera 109 in step S607. Moreover, the EXT CPU 106 transmits extender identification information to the exchange lens 101 (lens CPU 102) in step S608. The extender identification information is the same as that described in the first embodiment.

Thereafter, the EXT CPU 106 switches the communication disconnecting switch 103 to the connection state in step S609, enables the camera-lens communication through the first communication channel, and then transfers to the power-saving mode in step S610. The "power-saving mode" is the same as that described in the first embodiment, and serves as one of the operation restricting modes.

The lens CPU 102 of the new exchange lens that has received the extender identification information from the EXT CPU 106 in the step S608 stores the extender identification information in the memory (not illustrated) in the lens CPU 102. Whether the memory may be a non-volatile memory or a volatile memory is not a matter as long as it can store the extender identification information while the extender 105 is set to the power-saving mode.

On the other hand, in step S605, when the lens identification information indicates that the old exchange lens requires the correction processing of the lens optical information, the EXT CPU 106 proceeds to step S611. In the step S611, the EXT CPU 106 determines the product type of the camera 109 based on the camera identification information obtained in the step S604. When the camera 109 is a new camera having a newer design than that of the extender 105 and does not require the correction processing of the received lens optical information by the EXT CPU 106, then the EXT CPU 106 moves to step S612.

In the step S612, the EXT CPU 106 switches the communication disconnecting switch 103 to the disconnection state and enables the camera-lens communication through the second communication channel. Next, in step S613, the EXT CPU 106 waits for an incoming extender identification signal request instruction from the camera 109 (camera CPU 110) at this state. When receiving the extender identification signal request instruction, the EXT CPU 106 transmits the extender identification information to the camera 109 in step S614. Thereafter, the EXT CPU 106 moves to the step S609, switches the communication disconnecting switch 103 to the connection state, and then transfers to the power-saving mode in step S610.

When the camera 109 is an old camera that requires the correction processing of the received lens optical information by the EXT CPU 106 in step S611, or when both the camera 109 and the exchange lens 101 are old types, the EXT CPU 106 moves to step S615. In the step S615, the EXT CPU 106 proceeds with the correction processing of the lens optical information described for the flowchart in FIG. 3.

Another operation may be performed in the step S615 in addition to the correction processing of the lens optical information described for the flowchart in FIG. 3.

Figure 7:
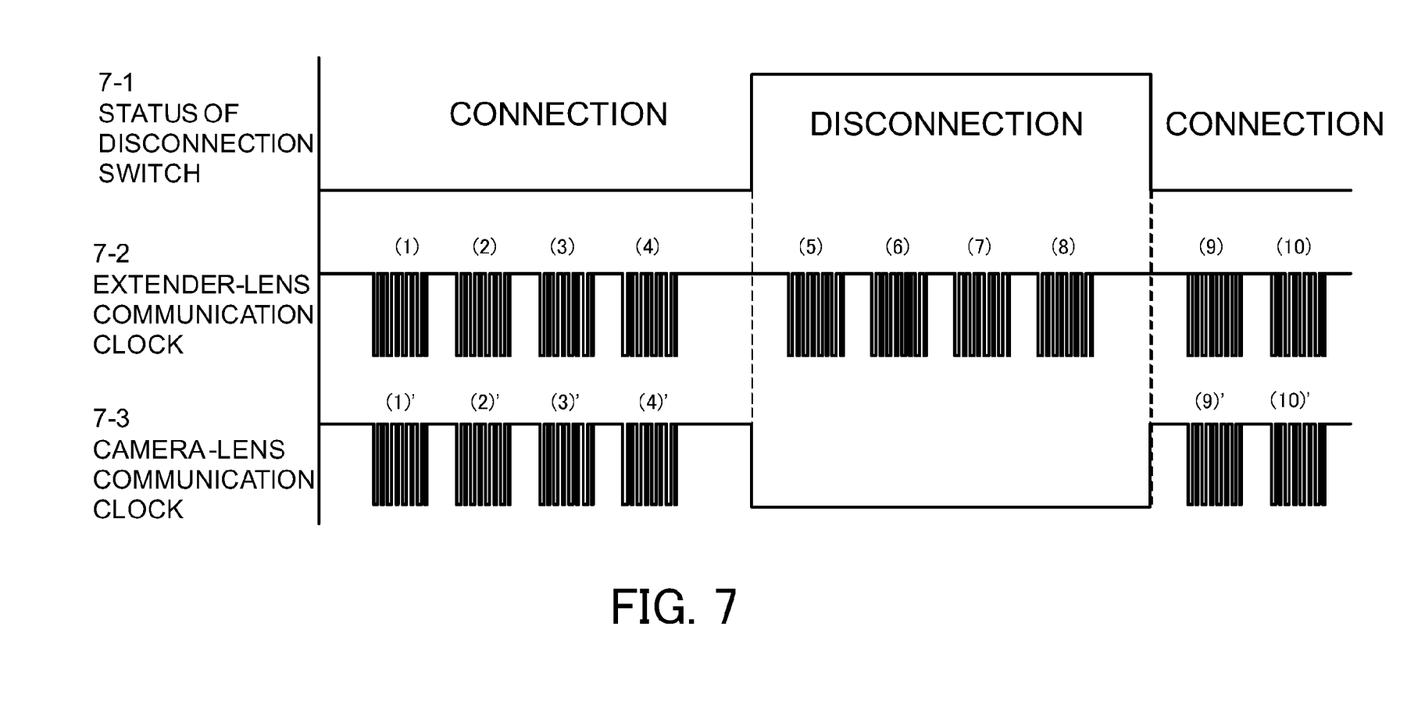
FIG. 7 is an operational timing chart of the intermediate accessory according to the second embodiment.

A timing chart in FIG. 7 illustrates a time sequence of an operation of the camera system in which the extender 105 is attached to a new exchange lens. Reference numeral 7-1 denotes a state of the communication disconnecting switch 103 (disconnection state or connection state). Reference numeral 7-2 denotes a communication clock between the extender 105 and the exchange lens 101. Reference numeral 7-3 denotes a communication clock between the camera 109 and the extender 105.

(1) to (4) in the extender-lens communication clock 7-2 are identical to (1)' to (4)' in the camera-extender communication clock 7-3, because the communication disconnecting switch 103 has been set to the connection state at this time. In other words, they illustrates transmission/reception timings of lens identification information request instruction transmitted from the camera 109 to the exchange lens 101 and responding lens identification information transmitted from the exchange lens 101 to the camera 109.

Since the extender 105 has already determined the product type of the exchange lens 101 and identified it as a new exchange lens when it receives (4), the extender 105 then sets the communication disconnecting switch 103 to the disconnection state just after the determination. Thereafter, in (5) to (8) in the extender lens communication clock 7-2, the extender 105 fixes the communication clock to the low state, outputs the busy signal to the camera 109, and transmits extender identification information to the exchange lens 101.

After transmitting the extender identification information with (8), the extender 105 (EXT CPU 106) switches the communication disconnecting switch 103 from the disconnection state to the connection state, and transfers to the power-saving mode.

After that, the first communication channel as a direct communication line between the camera 109 and the exchange lens 101 is set to the connection state, and thus the extender-lens communication clock 7-2 after (9) and the camera-lens communication clock 7-3 after (9)' employ the same communication clock. The extender 105 (EXT CPU 106) does not involve in the communication between the camera 109 and the exchange lens 101 after it transfers to the power-saving mode. Therefore, the camera 109 and the exchange lens 101 can communicate with each other at a similar communication speed and with a similar consumption power to those with no extender 105 attached.

Figure 8:
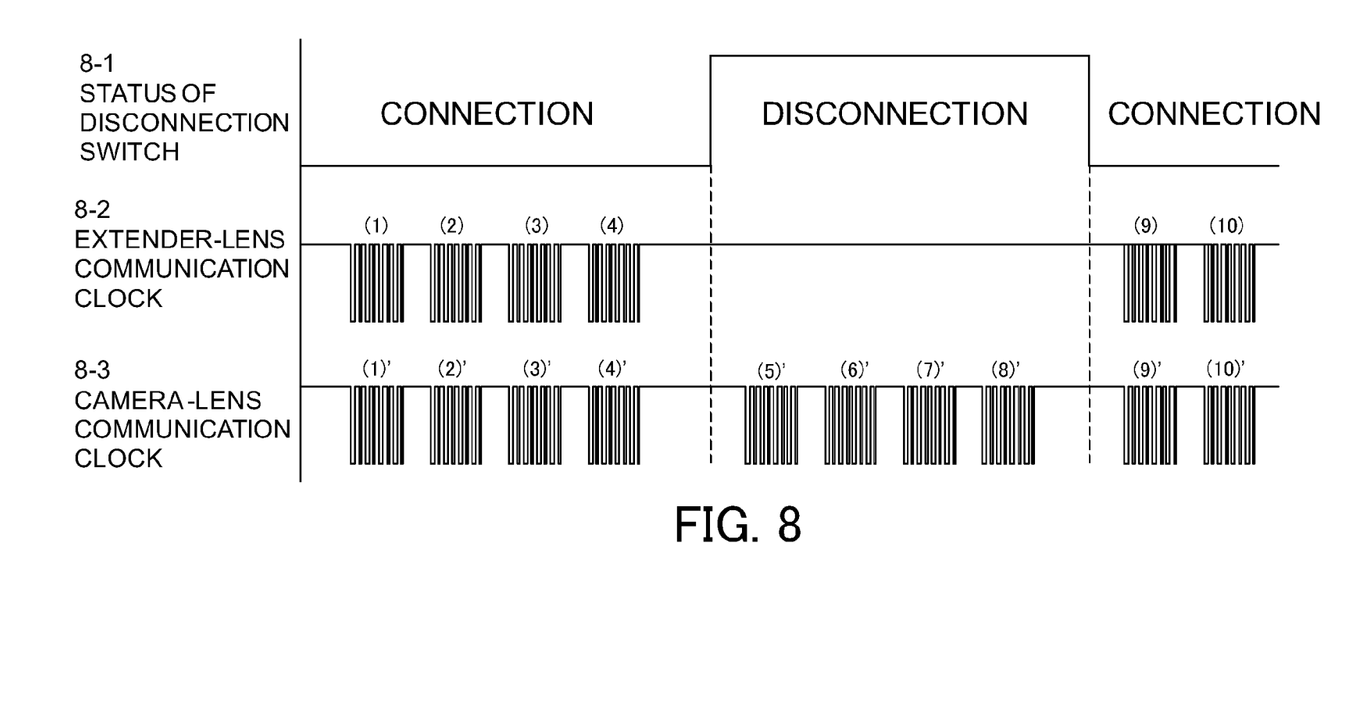
FIG. 8 is a timing chart illustrating operational timings of the intermediate accessory according to the second embodiment.

A timing chart in FIG. 8 illustrates a time sequence of an operation of the camera system in which the extender 105 is attached to the new camera. Reference numeral 8-1 denotes a state of the communication disconnecting switch 103 (disconnection state or connection state). Reference numeral 8-2 denotes a communication clock between the extender 105 and the exchange lens 101. Reference numeral 8-3 denotes a communication clock between the camera 109 and the extender 105.

(1) to (4) in the extender-lens communication clock 8-2 are identical to (1)' to (4)' in the camera-extender communication clock 8-3, because the communication disconnecting switch 103 has been set to the connection state at this time. In other words, they illustrates transmission/reception timings of lens identification information request instruction transmitted from the camera 109 to the exchange lens 101 and responding lens identification information transmitted from the exchange lens 101 to the camera 109.

Since the extender 105 has already determined the product type of the camera 109 and identified it as a new camera when it receives (4), the extender 105 sets the communication disconnecting switch 103 to the disconnection state just after the determination. Thereafter, in (5)' to (8)' in the camera-extender communication clock 8-3, the extender 105 transmits the extender identification information to the camera 109 in response to the extender identification signal request instruction from the camera 109.

After transmitting the extender identification information with (8)', the extender 105 (EXT CPU 106) switches the communication disconnecting switch 103 from the disconnection state to the connection state, and transfers to the power-saving mode.

After that, the first communication channel as a direct communication line between the camera 109 and the exchange lens 101 is set to the connection state, and thus the extender-lens communication clock 8-2 after (9) and the camera-lens communication clock 8-3 after (9)' employ the same communication clock. The extender 105 (EXT CPU 106) does not involve in the communication between the camera 109 and the exchange lens 101 after it transfers to the power-saving mode. Therefore, the camera 109 and the exchange lens 101 can communicate with each other at a similar communication speed and with a similar consumption power to those with no extender 105 attached.

As described above, this embodiment has described a camera system that does not suddenly start a communication between the camera 109 and the exchange lens 101 with a new communication protocol which the extender 105 cannot recognize. However, the present invention is applicable to the camera system that suddenly starts the communication with the new communication protocol by combining this embodiment with the first embodiment. More specifically, the operation of the first embodiment is performed just after the extender 105 is attached, and whether or not the exchange lens 101 is a new exchange lens is determined. When it is not the new exchange lens, the operation of the second embodiment follows, and whether or not the camera 109 is a new camera is determined. Thereby, even for the camera system that suddenly starts the communication with the new communication protocol, the extender 105 determines whether the exchange lens 101 and the camera 109 are old or new, and a proper operation may be set in accordance with the determination results.

Even in this embodiment, the extender 105 (EXT CPU 106) does not release the power-saving mode (operation restricting mode) by the communication from the camera 109 and the exchange lens 101, but maintains the power-saving mode.

According to this embodiment, in a camera system including a new exchange lens or a new camera in which the extender 105 does not require the correction of the lens optical information, the extender 105 enables the direct communication between the exchange lens 101 and the camera 109, and transfers to the power-saving mode (operation restricting mode). Thereby, this embodiment can realize a camera system that can reduce the power consumption, and avoid malfunctions of the extender 105, the camera 109, and the exchange lens 101.

Each of the above embodiments has described a case where the EXT CPU 106 provides the predetermined processing (correction processing) for the lens optical information to be transmitted from the exchange lens 101 to the camera 109. However, the EXT CPU 106 may provide the predetermined processing for the information transmitted from the camera 109, and transmit the information that has undergone the predetermined processing to the exchange lens 101. In other words, the present invention is applicable as long as the information processor of the intermediate accessory performs the predetermined processing for the information received from one of the camera and the exchange lens, and transmits the information that has undergone the predetermined processing to the other of the camera and the exchange lens.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-177019, filed Aug. 6, 2010 which is hereby incorporated by reference herein in its entirety.

What is claimed is:

1. An intermediate accessory attachable between a camera and an exchange lens which are configured to communicate with each other, the intermediate accessory comprising:
   an information processor configured to provide predetermined processing for information received from one of the camera and the exchange lens, and to transmit information that has undergone the predetermined processing, to the other of the camera and the exchange lens;
   a first communication channel configured to enable the camera and the exchange lens to communicate with each other without intervening the information processor;
   a second communication channel configured to enable the camera and the exchange lens to communicate with each other through the information processor; and
   a switch configured to switch between a first connection state and a second connection state, the first connection state connecting the first communication channel and disconnecting the second communication channel, and the second connection state disconnecting the first communication channel and connecting the second communication channel,
   wherein the intermediate accessory sets the second connection state using the switch while the camera and the exchange lens are being attached,
   wherein the intermediate accessory obtains lens identification information from the exchange lens, which is used to identify the exchange lens, and
   wherein the intermediate accessory sets the first connection state using the switch and transfers to an operation restricting mode used to restrict at least part of an operation the intermediate accessory, when the lens identification information indicates a specific exchange lens that does not require the predetermined processing.

2. The intermediate accessory according to claim 1, wherein the intermediate accessory transmits to the exchange lens intermediate accessory identification information used to identify the intermediate accessory, and transfers to the operation restricting mode, when the lens identification information indicates the specific exchange lens.

3. The intermediate accessory according to claim 1, wherein the intermediate accessory does not release the operation restricting mode by a communication between the camera and the exchange lens, and maintains the operation restricting mode.

4. The intermediate accessory according to claim 1, wherein the intermediate accessory is attached to the camera and the exchange lens, and configured to set the second connection state just after power from the camera is supplied to the intermediate accessory and the exchange lens.

5. A camera system comprising:
   a camera and an exchange lens which are configured to communicate with each other; and
   an intermediate accessory according to claim 1 attached between the camera and the exchange lens.

6. A camera system comprising a camera and an exchange lens which are configured to communicate with each other, and an intermediate accessory according to claim 2 attached between the camera and the exchange lens,
   wherein the exchange lens stores the intermediate accessory identification information received from the intermediate accessory in a memory provided in the exchange lens, and
   wherein when the intermediate accessory in the operation restricting mode receives a transmission request of the accessory identification information from the camera, the exchange lens transmits the accessory identification information stored in the memory to the camera.

7. An intermediate accessory attachable between a camera and an exchange lens which are configured to communicate with each other, the intermediate accessory comprising:
   an information processor configured to provide predetermined processing for information received from one of the camera and the exchange lens, and to transmit information that has undergone the predetermined processing, to the other of the camera and the exchange lens;
   a first communication channel configured to enable the camera and the exchange lens to communicate with each other without intervening the information processor;
   a second communication channel configured to enable the camera and the exchange lens to communicate with each other through the information processor; and
   a switch configured to switch between a first connection state and a second connection state, the first connection state connecting the first communication channel and disconnecting the second communication channel, and the second connection state disconnecting the first communication channel and connecting the second communication channel,
   wherein the intermediate accessory sets the first connection state using the switch, while the camera and the exchange lens are attached,
   wherein the intermediate accessory obtains lens identification information used to identify the exchange lens, and camera identification information used to identify the camera, which are communicated between the camera and the exchange lens through the first communication channel, and
   wherein the intermediate accessory transfers to an operation restricting mode used to restrict at least part of an operation of the intermediate accessory when the lens identification information indicates a specific exchange lens that does not require the predetermined processing, or the camera identification information indicates a specific camera that does not require the predetermined processing.

8. The intermediate accessory according to claim 7, wherein the intermediate accessory sets the second connection state using the switch, transmits intermediate accessory identification information used to identify the intermediate accessory to the exchange lens, and transfers to the operational restricting state, when the lens identification information indicates the specific exchange lens.

9. The intermediate accessory according to claim 7, wherein the intermediate accessory sets the first connection state using the switch, transmits intermediate accessory identification information used to identify the intermediate accessory to the camera, and transfers to the operational restricting state, when the camera identification information indicates the specific camera.

10. The intermediate accessory according to claim 7, wherein the intermediate accessory does not release the operation restricting mode by a communication between the camera and the exchange lens, and maintains the operation restricting mode.

11. The intermediate accessory according to claim 7, wherein the intermediate accessory is attached to the camera and the exchange lens, and configured to set the first connection state just after power from the camera is supplied to the intermediate accessory and the exchange lens.

12. A camera system comprising:
a camera and an exchange lens which are configured to communicate with each other; and
an intermediate accessory according to claim 7 attached between the camera and the exchange lens.

13. A camera system comprising a camera and an exchange lens which are configured to communicate with each other, and an intermediate accessory according to claim 8 attached between the camera and the exchange lens,
wherein the exchange lens stores the intermediate accessory identification information received from the intermediate accessory in a memory provided in the exchange lens, and
wherein when the intermediate accessory in the operation restricting mode receives a transmission request of the accessory identification information from the camera, the exchange lens transmits the accessory identification information stored in the memory to the camera.

* * * * *